(12) United States Patent
Koodli et al.

(10) Patent No.: US 7,460,511 B2
(45) Date of Patent: Dec. 2, 2008

(54) DEVICE CONNECTIVITY

(75) Inventors: Rajeev Koodli, Sunnyvale, CA (US);
Hannu Flinck, Helsinki (FI)

(73) Assignee: Nokia Corporation, Espoo (FI)

( * ) Notice: Subject to any disclaimer, the term of this patent is extended or adjusted under 35 U.S.C. 154(b) by 589 days.

(21) Appl. No.: 11/129,432

(22) Filed: May 16, 2005

(65) Prior Publication Data

US 2006/0140165 A1    Jun. 29, 2006

Related U.S. Application Data

(60) Provisional application No. 60/638,142, filed on Dec. 23, 2004.

(51) Int. Cl.
| H04Q 7/00 | (2006.01) |
| H04Q 7/24 | (2006.01) |
| H04L 12/28 | (2006.01) |
| H04B 7/00 | (2006.01) |
| G06F 15/16 | (2006.01) |

(52) U.S. Cl. .................. 370/338; 370/328; 370/400; 370/401; 455/41.2; 709/209

(58) Field of Classification Search ......... 370/400–409, 370/428–429, 574, 401, 349–350, 328–329, 370/310, 338, 285, 293, 341, 352, 355–356, 370/395.5–395.54, 395.65, 412, 447, 461, 370/901–903, 908, 911–913; 455/41.2–41.3, 455/95, 445, 462–466, 500, 517, 550.1, 552.1, 455/556.1–556.2, 557–558, 41.1, 418–421, 455/422.1, 424–425, 432.1–432.3, 435.1–435.3, 455/436–444, 446–451, 452.1–452.2, 509, 455/524–525, 555, 561; 709/208–211, 226, 709/221–222, 228–229, 242
See application file for complete search history.

(56) References Cited

U.S. PATENT DOCUMENTS

| 7,298,761 | B2 * | 11/2007 | Hong ..................... 370/466 |
| 2001/0002912 | A1 * | 6/2001 | Tony et al. .............. 370/487 |
| 2002/0044549 | A1 * | 4/2002 | Johansson et al. ........ 370/386 |
| 2004/0167988 | A1 * | 8/2004 | Rune et al. .............. 709/238 |
| 2004/0240445 | A1 * | 12/2004 | Shin et al. ............... 370/389 |
| 2005/0007985 | A1 * | 1/2005 | Park et al. .............. 370/338 |
| 2005/0018645 | A1 * | 1/2005 | Mustonen et al. ........ 370/349 |
| 2005/0213531 | A1 * | 9/2005 | Nanda .................... 370/328 |
| 2005/0220063 | A1 * | 10/2005 | Hong et al. ............. 370/338 |
| 2005/0250445 | A1 * | 11/2005 | Hansson ................. 455/41.2 |
| 2005/0282494 | A1 * | 12/2005 | Kossi et al. ............. 455/41.2 |

* cited by examiner

*Primary Examiner*—Meless N Zewdu
(74) *Attorney, Agent, or Firm*—Squire, Sanders & Dempsey

(57) ABSTRACT

There is disclosed a system comprising a plurality of wireless piconets, each piconet including one or more wireless devices, each device being provided with an Internet protocol, IP, address such that the devices of the plurality of piconets form a wireless subnetwork. There is also disclosed a device for connection in a wireless piconet configured to receive a prefix for generation of an IP address, and further configured to generate an IP address in dependence on the prefix and a unique identifier of the device.

63 Claims, 9 Drawing Sheets

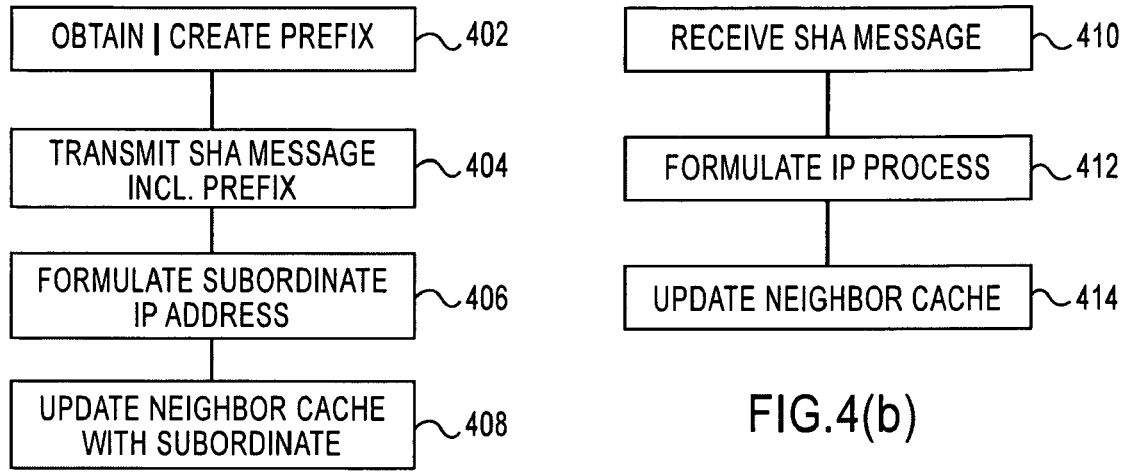
FIG.4(a)
FIG.4(b)
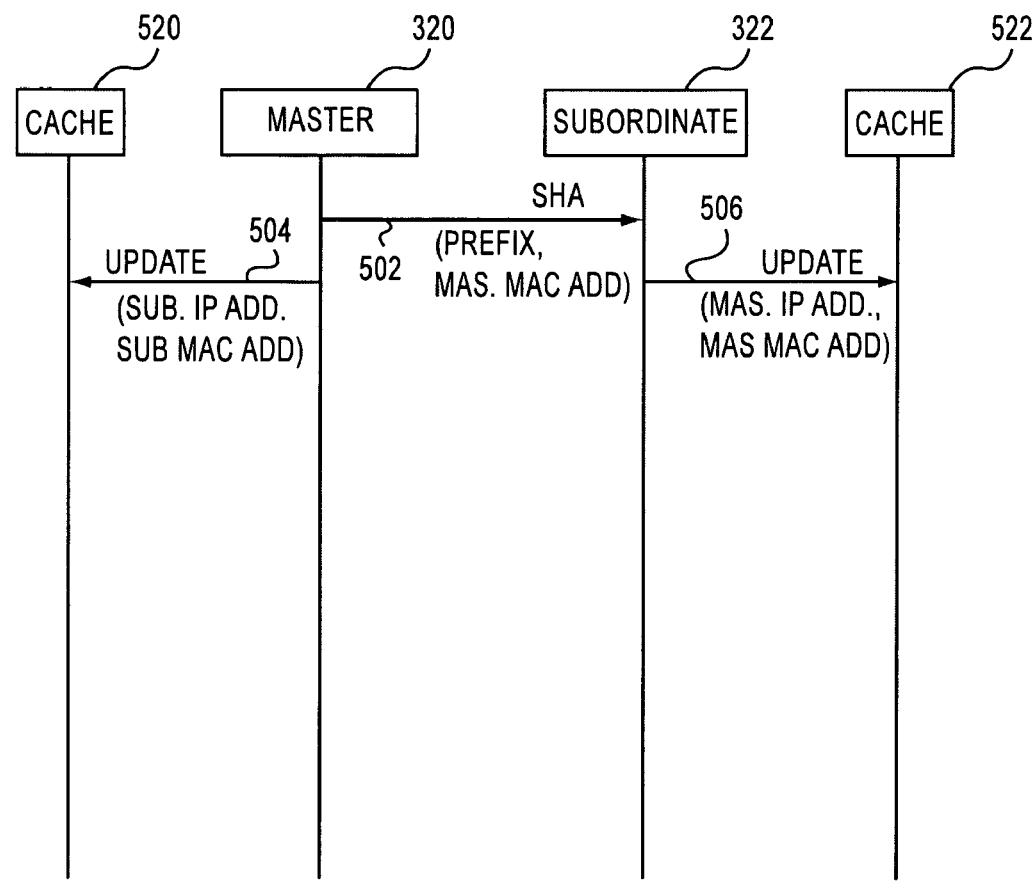
FIG.5

DEVICE CONNECTIVITY

BACKGROUND TO THE INVENTION

1. Field of the Invention

The invention relates to the interconnection of Bluetooth enabled devices, and particularly but not exclusively to the formation of dynamic sub-networks for Bluetooth enabled devices.

2. Description of the Related Art

The Bluetooth (BT) personal area network (PAN) profile (BT-PAN) defines how a group of Bluetooth enabled devices may form a piconet. The piconet described in the BT-PAN profile may consist of up to seven active hosts.

A piconet as defined in the BT-PAN profile connects Bluetooth devices at a link-layer, so that other appropriate Profiles can be used between the devices.

The BT-PAN profile definition suggests that a Bluetooth enabled device may become internet protocol (IP) capable. An IP capable Bluetooth enabled device would require an IP address. However there is not disclosed any information as to how a Bluetooth enabled device may acquire an IP address.

In addition, the piconet defined by the BT-PAN profile allows only up to seven active hosts. It may be desirable, in certain circumstances, to allow for more than seven active hosts. Further, the BT-PAN does not support scatternets, that is a combined network of more than one piconet.

It is an aim of the invention to provide an improved technique for allowing interconnection at Bluetooth enabled devices.

SUMMARY OF THE INVENTION

On establishment of a piconet, a master device of the piconet determines a prefix for formulating an IP address of the piconet.

The prefix may be obtained from a further master device with which a connection is established. The prefix may be obtained from a gateway to which the master device is connected. The prefix may be created pseudo-randomly.

Piconets may be interconnected to from a subnetwork, or subnet. Each piconet within a subnet may have a unique prefix or alternatively a common prefix may be provided for two or more of the piconets within a subnetwork. Prefixes are preferably allocated in a delegated manner.

The master device may transmit the determined prefix of the piconet to subordinate devices of the piconet. The master device may transmit the prefix to the subordinate devices in a subnet-head advertisement message.

A subordinate device of a piconet may be adapted to receive a prefix from a master device of the piconet. The prefix is preferably received in a subnet-head advertisement message. The subordinate device may formulate an IP address for itself in dependence on the prefix. The subordinate device may formulate an IP address for itself in dependence on the prefix and an IEEE MAC address of the subordinate device. The subordinate address may update a neighbour cache thereof with the IP address and/or IEEE MAC address of the master device. The IP address and/or IEEE MAC address of the master device are derived from the received subnet-head advertisement message.

The master device may determine the IP address of the subordinate device in dependence of the IEEE MAC address of the subordinate and the prefix. The IEEE MAC address of the subordinate is determined in signalling between the master and the subordinate, such as during establishment of communication there between. On determination of the subordinate IP address, the master may update its associated neighbour cache.

The master device is adapted to maintain a destination cache. The destination cache include the identity of any nodes outside of the master devices piconet, together with next-hop information for such nodes.

A method of transmitting a message between devices within a subnet comprised of a plurality of piconets, the method comprising: transmitting a packet from a subordinate device of a source piconet to a master device of the source piconet; receiving the packet at the master device of the source piconet; scanning the master device neighbour cache to determine if the destination device is in the source piconet; responsive to the destination device being in the source piconet transmitting the packet from the master device to the destination device; responsive to the destination device not being in the source piconet, scanning the master device destination cache to determine if the destination device is identified therein; responsive to the destination device being identified in the destination cache, transmitting the packet to the destination device in accordance with stored routing information in the destination cache; responsive to the destination device not being in the destination cache: buffering the packet to be transmitted; transmitting a destination discovery message to all master devices in the subnet; receiving the destination discovery message at one or more further master devices, and at each one or more further master devices determining whether the address of the destination device is included in its neighbour cache, and responsive to a match updating the destination cache of the respective master device with the IP address of the source master, the MAC address of the packet, and the interface on which the destination discovery message was received; copying the destination address into a reply message and forwarding such message using the destination cache entry for the master device; responsive to receipt of such message at the source master, and responsive thereto at the source master updating the destination cache and forwarding the packet toward the destination device.

On receipt of multiple replies to the destination discovery message, the destination master is preferably adapted to discard those other than the one arriving on the interface which is used for the reverse path toward the source master.

The invention thus proposes, in embodiments, a method for forming an IP address for a Bluetooth enabled device which connects to another Bluetooth enabled device. Preferably, all hosts within a piconet or scatternet may share a common network prefix. The common network prefix allows simplification of routing across multiple piconets. A scatternet is the term for multiple piconets. When a piconet grows into a scatternet, for instance when a new host attaches to an existing piconet, embodiments of the invention advantageously allow the new host to become part of the existing sub-network. When two piconets merge to form a scatternet, the invention and embodiments thereof allow a host that attaches to multiple piconets to multiple-home its interface, so that it can maintain topologically correct addresses in each piconet.

BRIEF DESCRIPTION OF THE FIGURES

The invention is now described by way of reference to particular preferable embodiments and with reference to the accompanying figures, in which:

FIGS. 4a and 4b illustrate the steps in a preferred embodiment of the invention for allocating an IP address to a Bluetooth enabled device;

FIG. 5 illustrates the signalling in allocating an IP address to a Bluetooth enabled device in accordance with an embodiment of the invention;

DESCRIPTION OF THE PREFERRED EMBODIMENTS

The invention is described herein by way of example with reference to particular embodiments. It should be understood that the invention is not limited to specific details of these embodiments. In particular the invention is described in the context of a sub-network, or subnet, of Bluetooth enabled devices, elements of which comprise smaller piconets.

Figure 1:
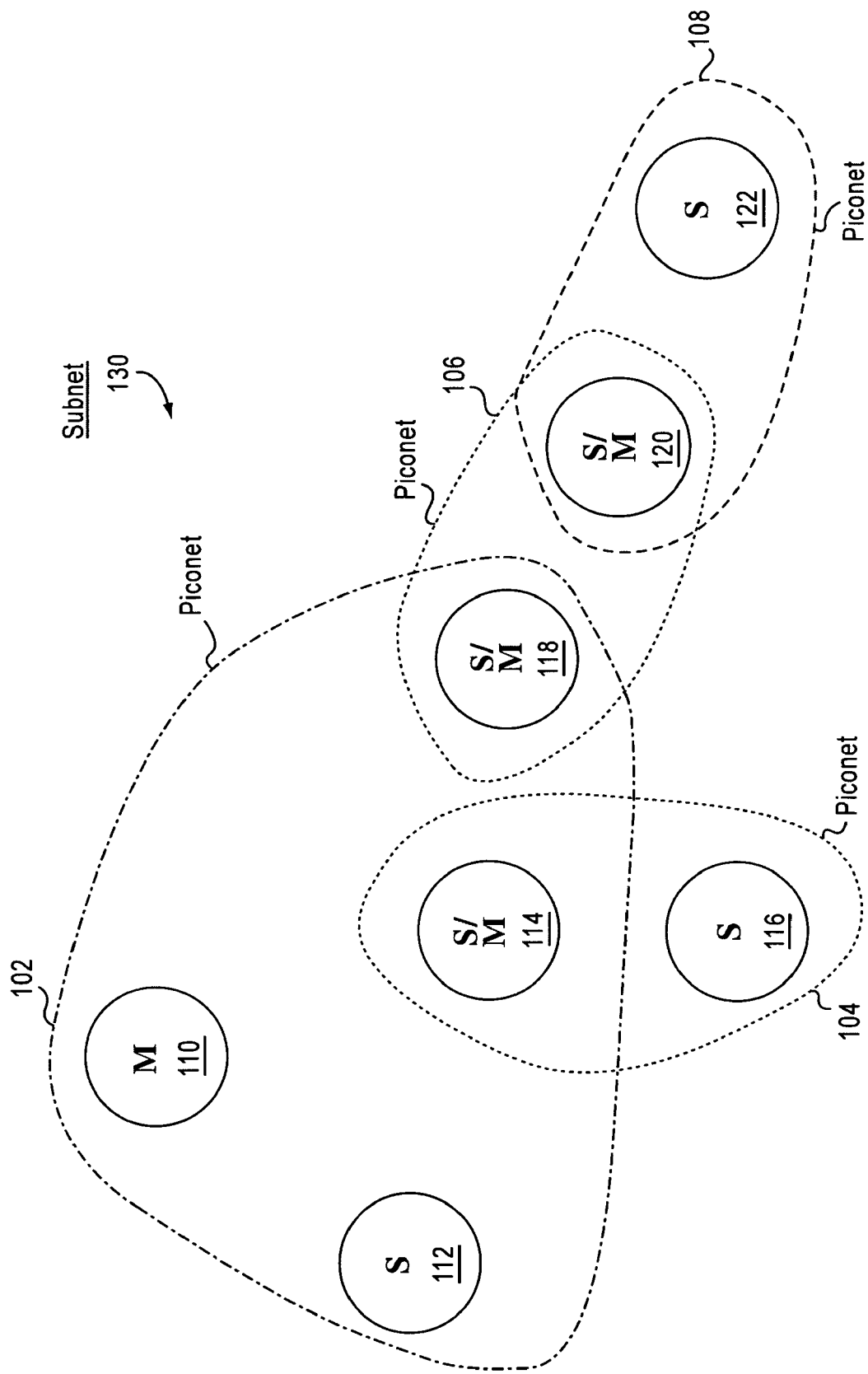
FIG. 1 illustrates a sub-network of Bluetooth enabled devices.

Referring to FIG. 1, a subnet 130 includes four piconets denoted by reference numerals 102, 104, 106, and 108. Each piconet includes one or more Bluetooth enabled devices. Within a piconet, a Bluetooth enabled device is either a master device or a subordinate device, denoted by M or S in FIG. 1. It should be noted that when a Bluetooth enabled device is part of more than one piconet, it may be a different type of device in each piconet. Thus, some Bluetooth enabled devices are master devices only, some Bluetooth enabled devices are subordinate devices only, and some Bluetooth enabled devices are both master devices and subordinate devices.

Referring again to FIG. 1, it can be seen that the piconet 102 includes four Bluetooth enabled devices, labelled 110, 112, 114, and 118. For the piconet 102, the device 110 is the master device, and the devices 112, 114, 118 are subordinate devices.

The piconet 104 includes the device 114 and a further device 116. The device 114 is the master device for the piconet 104, and the device 116 is a subordinate device. Thus, the device 114 is a subordinate device for the piconet 102, and the master device for the piconet 114.

The piconet 106 includes the device 118 and a further device 120. The device 118 is the master device for the piconet 106, and the device 120 is a subordinate device. The device 118 is thus a subordinate device for the piconet 102, and a master device for the piconet 106.

The piconet 108 includes the device 120 and a further device 122. The device 120 is the master device for the piconet 108, and the device 122 is a subordinate device for the piconet 108. The device 120 is thus a subordinate device of the piconet 106, and the master device of the piconet 108.

Whilst in the above examples no device is shown as being a member of more than two piconets, in theory a device may be a member of any number of piconets. In practice, however, a device is unlikely to be a member of a large number of piconets, as a device will generally be a member of more than one piconet if its location is at the boundary of a piconet.

Figure 2A:
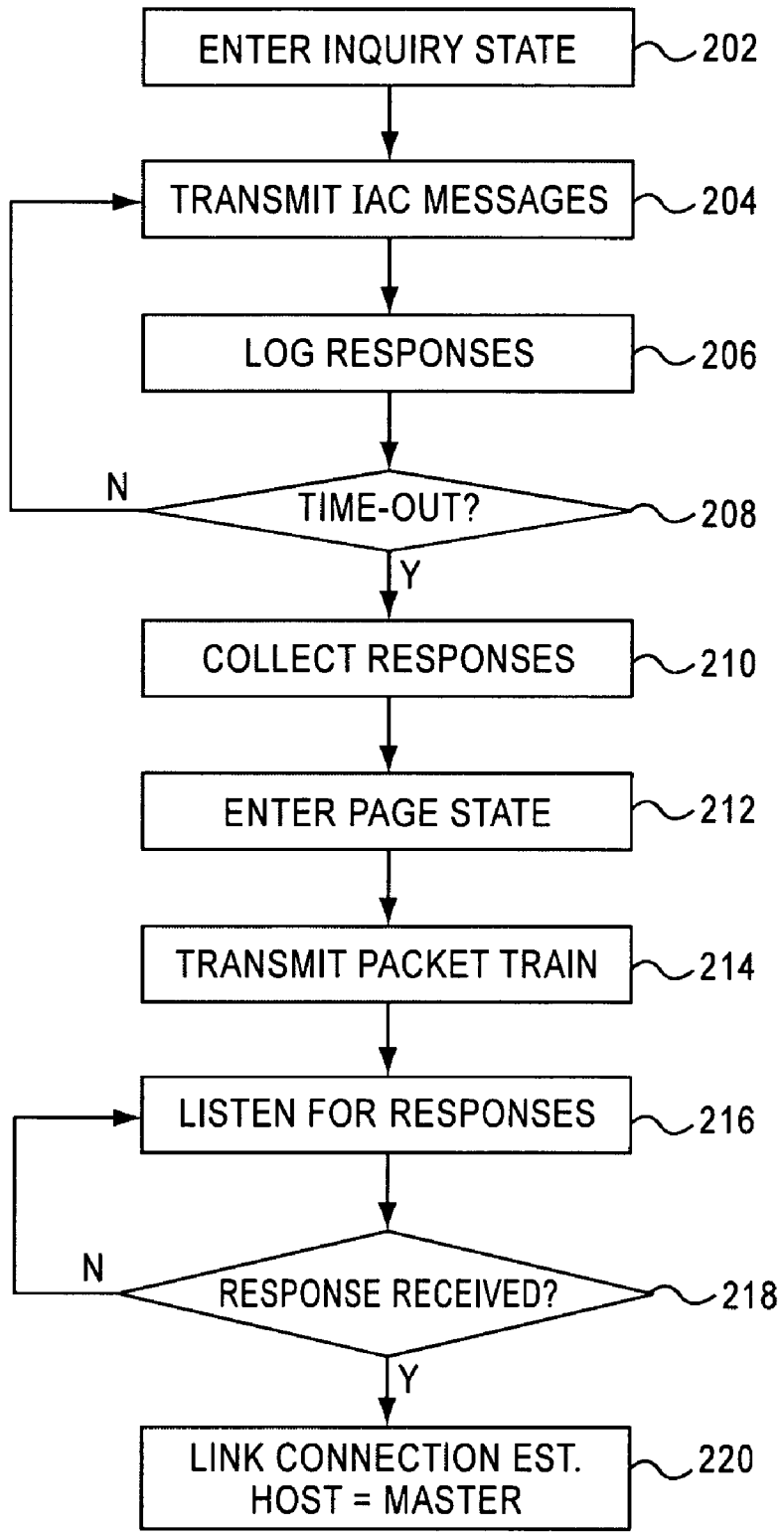
FIGS. 2a and 2b illustrate the steps in establishing a link between Bluetooth enabled devices.
Figure 2B:
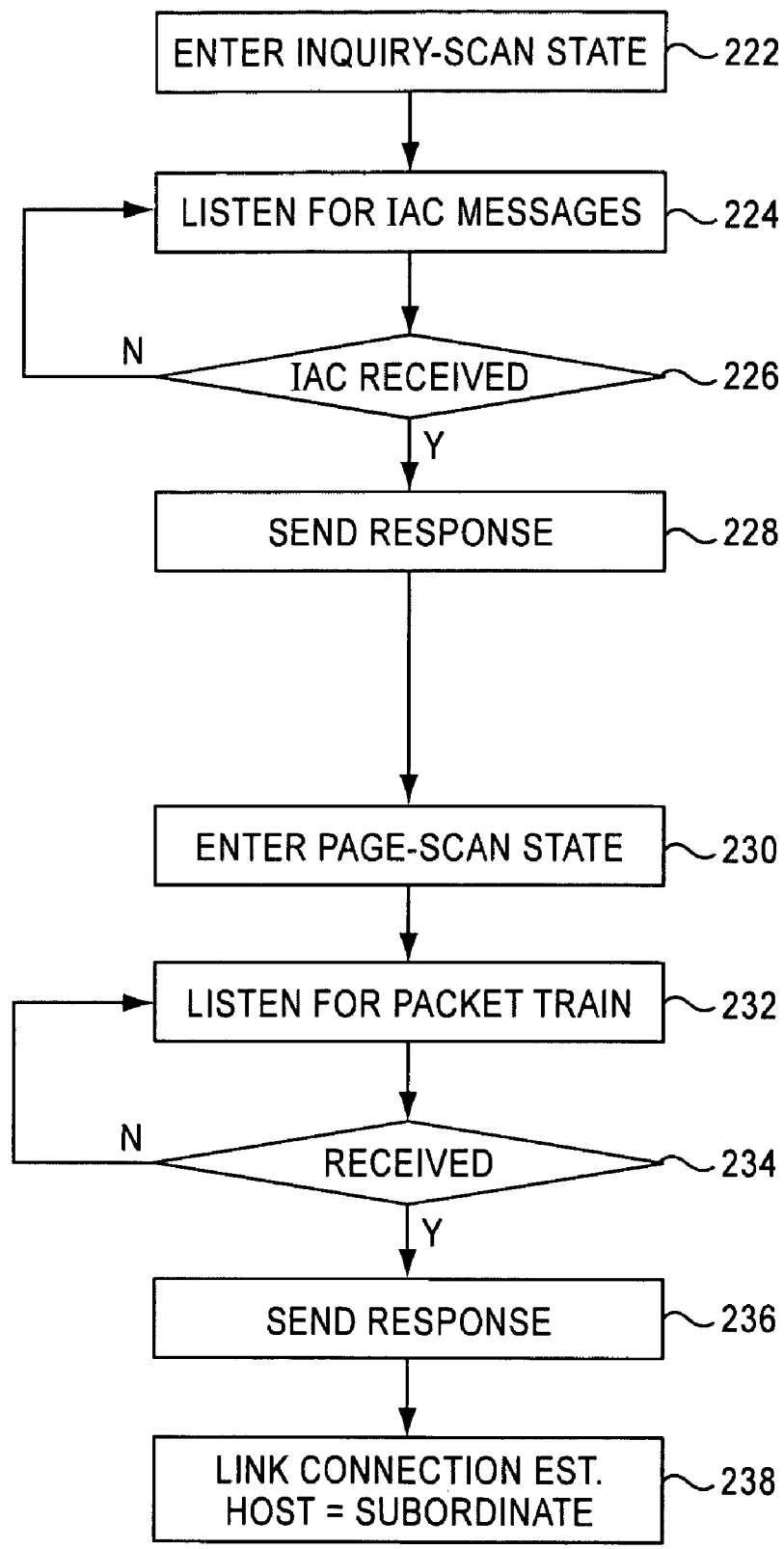
Figure 3:
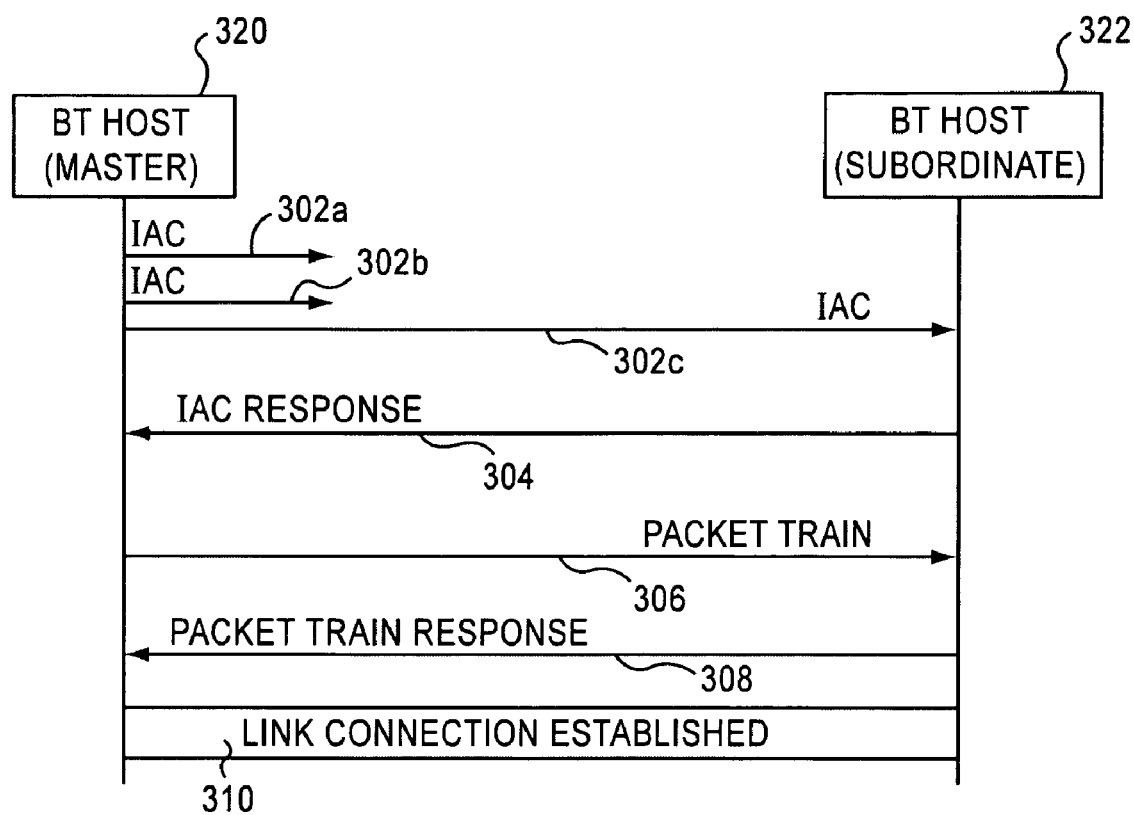
FIG. 3 illustrates the signalling in establishing a link between two Bluetooth enabled devices.

With reference to FIGS. 2a and 2b and FIG. 3 the steps in establishing a link connection between two Bluetooth enabled devices is now described. FIG. 2a illustrates the steps carried out by a Bluetooth host wishing to establish a link to another Bluetooth host. FIG. 2b illustrates steps carried out by a Bluetooth host to which a connection is made. FIG. 3 represents the signalling between the respective Bluetooth hosts.

Referring to FIG. 2a, in step 202 a Bluetooth host wishing to establish a link to another Bluetooth host enters an inquiry state, and repeatedly transmits short identification packets containing an inquiry access code (IAC). Referring to FIG. 3, this is illustrated by a Bluetooth host 320 transmitting packets 302a and 302b, containing an IAC.

A Bluetooth host that may be willing to connect to another Bluetooth host resides in an inquiry-scan state, listening for IAC packets. This is denoted by step 222 in FIG. 2b. As denoted in FIG. 3, at least one IAC packet, denoted by signal 302c, is received by a Bluetooth host 322 from the Bluetooth host 320.

The repeated transmission of the identification packets containing the IACs by the Bluetooth host 320 is denoted by steps 204, 206, and 208. In step 204 the Bluetooth host 320 transmits one or more IAC messages, in step 206 the Bluetooth host 320 logs any responses received responsive to the transmitted messages, and in step 208 the Bluetooth host 320 determines whether a predetermined time period has been completed. If the time period is not completed, then the steps 204 and 206 are repeated. If the time period is completed, then in step 210 the Bluetooth host 320 collects all of the responses that have been logged. All of the responses that have been logged would have been received from other Bluetooth hosts in an inquiry-scan state.

Steps 224, 226 and 228 of FIG. 2b illustrate how a Bluetooth host responds to an IAC message. In step 224 the Bluetooth host 322 listens for the receipt of IAC messages. If in a step 226 it is determined that no IAC message is received, then the method returns to step 224 and the Bluetooth host continues to listen for IAC messages. If in step 226 an IAC message has been received, in step 228 a response is sent to the Bluetooth host from which the message was received. The transmission of the IAC response from the Bluetooth host 322 is denoted by signal 304 in FIG. 3.

After the collection of the responses in step 210, the Bluetooth host 320 enters a "page" state, and then in step 214 transmits a train of packets. Referring to FIG. 2b, after the Bluetooth host 322 has responded to an inquiry message by sending a response, preferably the IAC response signal 304, then the Bluetooth host 322 enters a "page-scan" state as denoted by step 230.

The Bluetooth host 322, once entered into the page-scan state, in a step 232 listens for a packet train. If it is detected that no packet train is received in step 234, then the Bluetooth host 322 continues to listen for a packet train in step 232.

On receipt of a packet train from the Bluetooth host 320 as denoted by signal 306 in FIG. 3, the Bluetooth host 322 transitions to step 236, and sends a response thereto.

After transmitting the packet train in step 214, the Bluetooth host 320 transitions to step 216 and listens for responses thereto. If a response is not received in step 218, then the method reverts to step 216 and continues to listen for responses.

Following a response sent by the Bluetooth host 322 in step 236, as denoted by a packet train response signal 308 in FIG. 3, the Bluetooth host 320 transitions to step 220, and the link connection between the Bluetooth device is established. Similarly after the response is sent by the Bluetooth host 322 in step 236, in step 238 the link connection is determined to be established.

The link connection establishment is denoted by communication channel 310 in FIG. 3. Following the establishment of the link, the Bluetooth host device 320, initiating the establishment of the link, becomes the master device, and the Bluetooth device 322, responding to the initiation of the link establishment, becomes the subordinate device.

Thus, a link is established in this way between two Bluetooth enabled devices. It should be noted that following the transmission of packets containing an IAC from the Bluetooth enabled host entering an inquiry state, responses may be received from multiple further Bluetooth enabled hosts. Thus multiple link connections may be established from the initialising Bluetooth enabled host to further Bluetooth enabled hosts. In such case, the initialising Bluetooth enabled host is the master, and all further Bluetooth enabled hosts are subordinates.

The above described techniques, with reference to FIGS. 2 and 3, are known techniques in the art, and are not described in any further detail herein.

With reference to FIGS. 4a and 4b and FIG. 5, there is now described a technique in accordance with an embodiment of the invention. FIG. 4a describes steps carried out by the Bluetooth enabled host operating as a master device following establishment of link connection, and FIG. 4b illustrates the steps carried out by a Bluetooth enabled device configured as a subordinate device following a link establishment. FIG. 5 illustrates signalling between the respective devices.

After the link connection is established, preferably immediately after the establishment of the link, the master device 320 determines, by obtaining or creating, a prefix for formulating an IP address for a piconet. This is the IP address of the piconet for which the Bluetooth enabled device 320 is the master device. The master device 320 may obtain the prefix either from a gateway to which it is connected, and which may be further connected to the internet, or from another master device in respect of which the device is a subordinate device. In the event that the master is attached to neither a gateway nor a further master device, the master device 302 may create a 64-bit pseudo-random prefix. It should be noted that the size of the prefix generated may vary between implementations, but in a preferred embodiment is a 64-bit prefix.

A prefix may be common to a whole subnet, and not just to an individual piconet. However in a preferred arrangement there is provided a distinct or unique prefix for each piconet. If the master device retrieves the prefix from another device for which it is a subordinate, then those at least two piconets may have the same prefix. A particular preference to the order in which the master devices obtain a prefix may be provided in embodiments. For example, there may be a default technique, such as always obtaining from a gateway if a gateway is available, if a gateway is unavailable obtaining from a further master device, and if a connection to a further master device is unobtainable then randomly generating the prefix. A gateway may allocate prefix to piconets in such a way that each piconet has a unique prefix. For a prefix allocation, prefixes should be delegated. An example of an appropriate delegation is RFC 3587 of IETF.

If a gateway becomes available after determination of prefixes, then new prefixes are provided by the gateway to all devices associated therewith. Thus if prefixes are generated randomly or obtained from another master device, and only subsequent thereto a gateway becomes available to the subnet, then all prefixes are preferably replaced with prefixes generate by the gateway.

After the prefix is determined by the master device, either by creation or receipt, a subnet-head advertisement (SHA) message is transmitted from the master device 320 to the subordinate device 322. The SHA message 502 includes the prefix. The transmission of this message is denoted by step 404 in FIG. 4a.

In a step 410 the subordinate device 322 receives the SHA message. In a step 412, the subordinate device 322 then formulates an IP address for itself, based on the prefix contained in the message from the master device 320.

In a preferred embodiment, upon receiving the SHA message the subordinate device 322 formulates an IP address for itself using the 64-bit prefix and its IEEE MAC address. The IEEE MAC address is the same as the Bluetooth MAC address. The generation of the IP address in this way is in accordance with RFC 2462 of IETF.

Thereafter, in a step 414, the subordinate device 322 updates its neighbour cache with the IP address and MAC address of the master device 320, both of which are derived from the SHA message 502. As illustrated in FIG. 5, the subordinate 322 thus transmits an update message 506 to a cache 522 thereof.

Turning again to FIG. 4a, after the transmission of the SHA message 502 to the subordinate device 322, the master device 320 also formulates the IP address of the subordinate in step 406. The master device formulates the IP address in the same way in which the subordinate address formulates it. Thus, the master device 320 formulates an IP address for the subordinate based on the subordinate's IEEE MAC address, and the 64-bit prefix. The subordinate's IEEE MAC address is obtained by the master in previous signalling. The master device 320 then sends an update signal 504 to a cache 520 of the master device, to update a neighbour cache of the master device with the IP address and the Bluetooth MAC address of the subordinate device.

The master always keeps an updated copy of information in its neighbour cache. This means that whenever a host attaches to the master, an entry is created for that host. Whenever a host detaches from the master, the entry for that host is deleted from the master host neighbour cache. The Bluetooth baseband procedures are used to detect changes in link connectivity, and identify attachment or detachment of other hosts.

In addition to the neighbour cache, each master device also keeps a destination cache. The destination cache of each master device contains next-hop information for nodes residing outside of its piconet.

Figure 6:
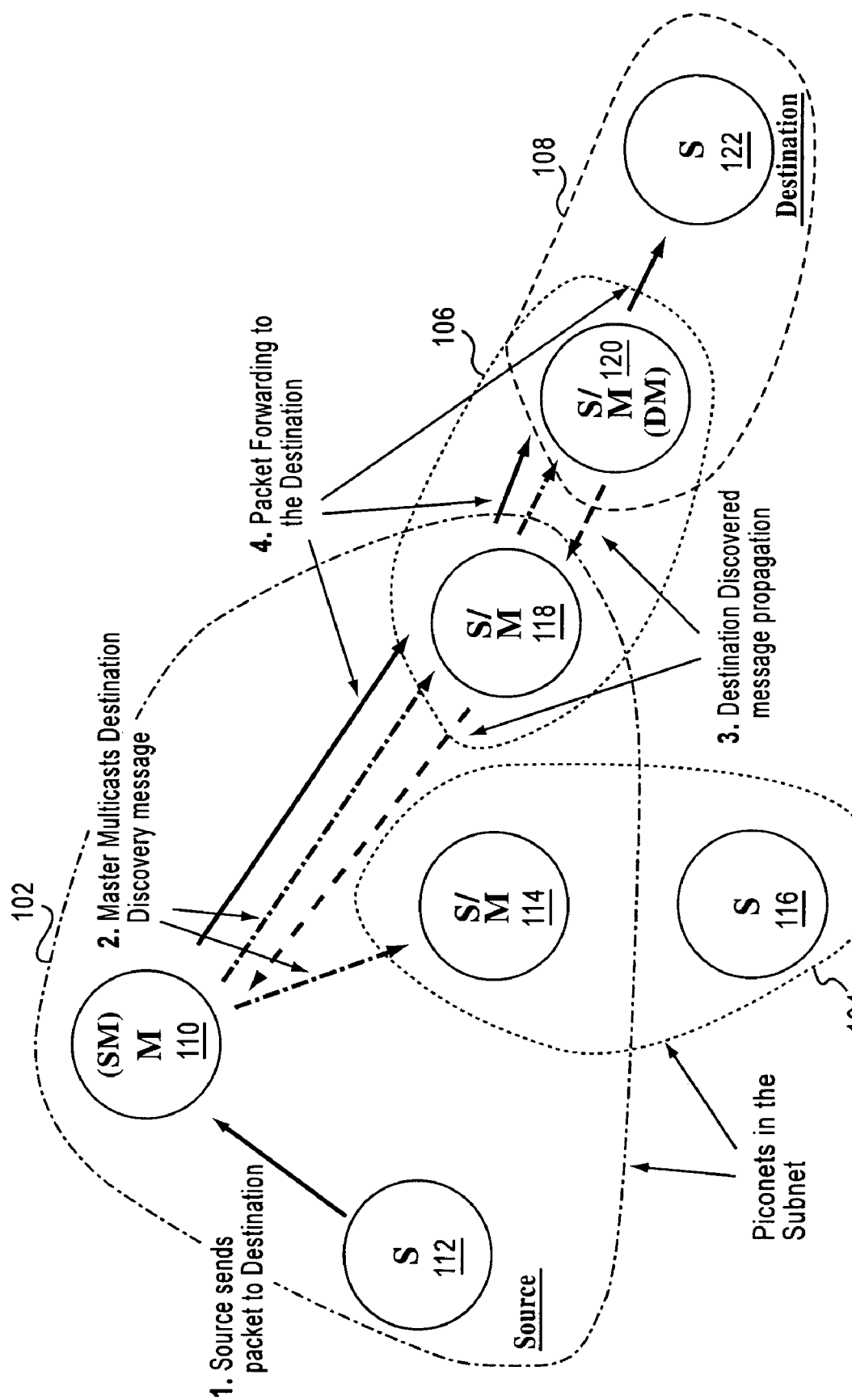
FIG. 6 illustrates Bluetooth enabled devices in a scatternet and the forwarding of packets in accordance with an embodiment of the invention.
Figure 7A:
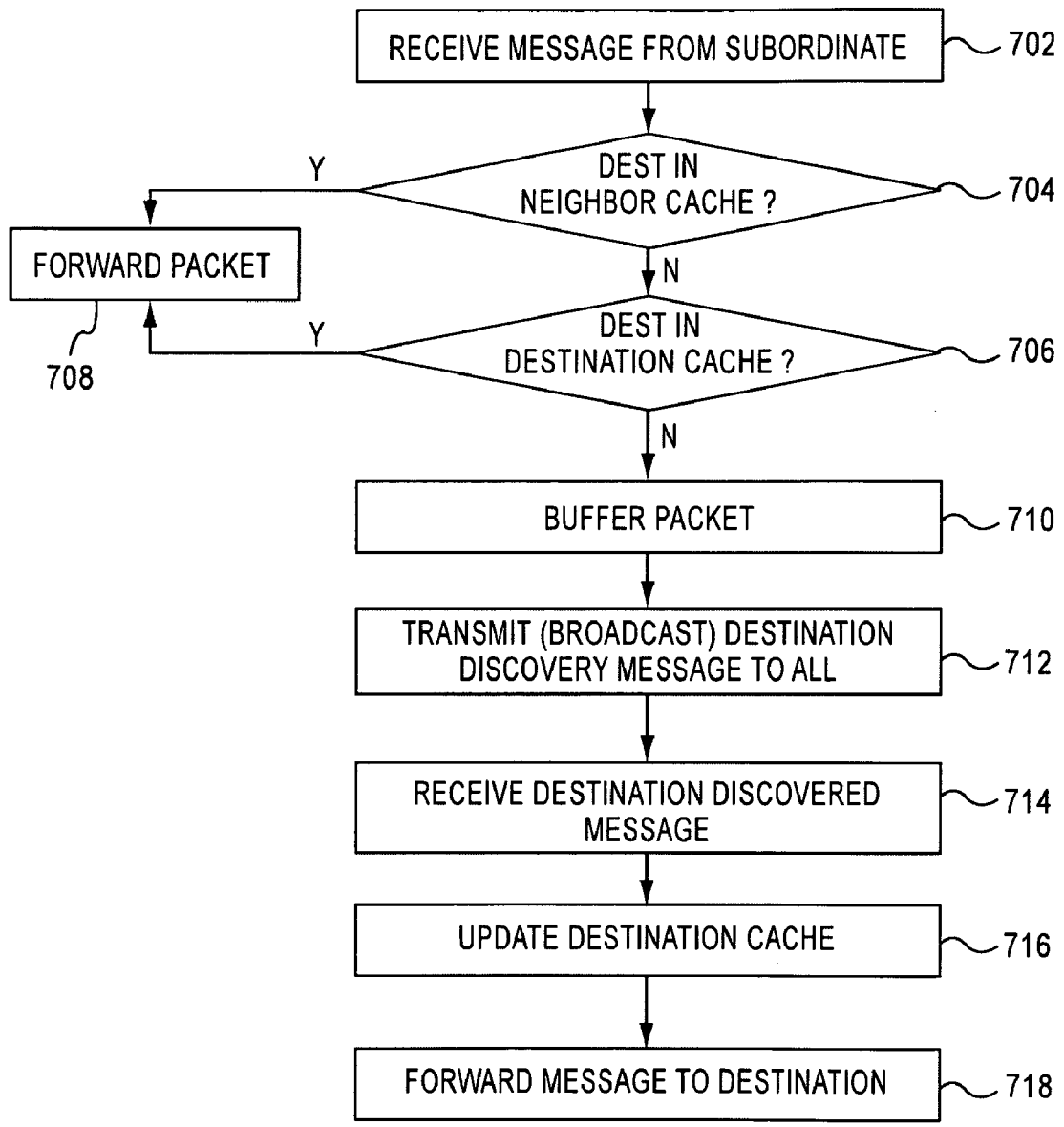
FIGS. 7a and 7b illustrate the steps in forwarding a packet in accordance with an embodiment of the invention in a scatternet of Bluetooth enabled devices.
Figure 7B:
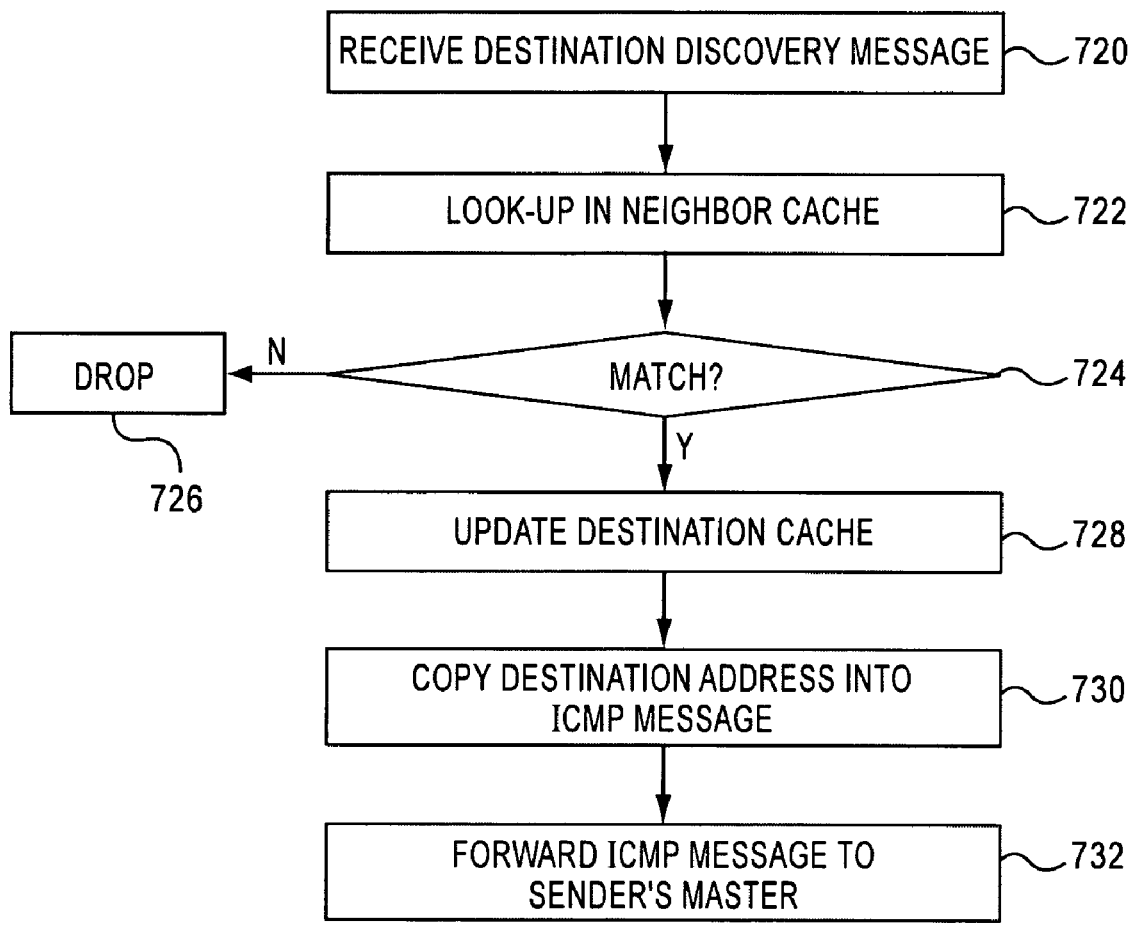
Figure 8:
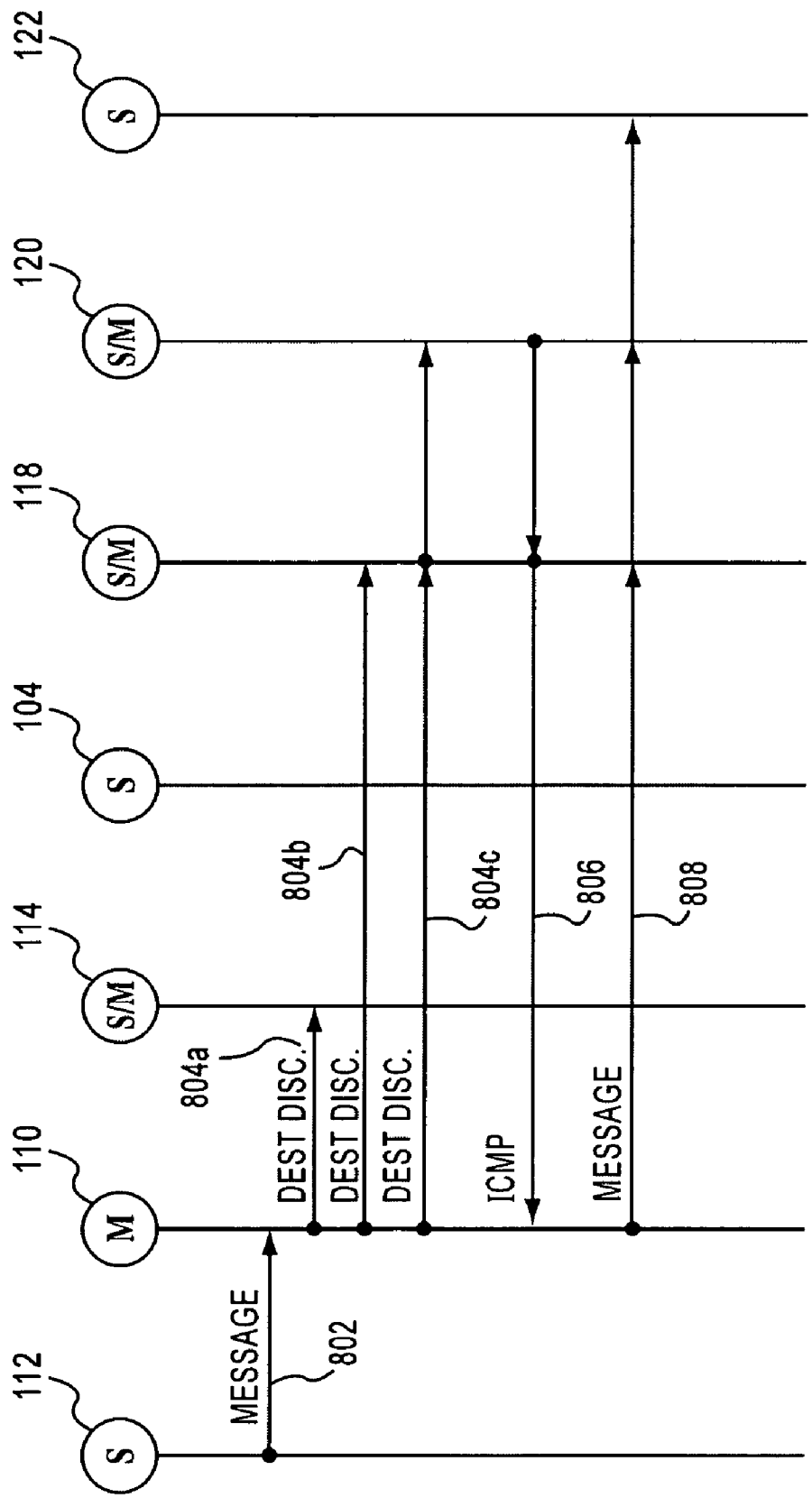
FIG. 8 illustrates the signalling between Bluetooth enabled devices in the scatternet of FIG. 6 in forwarding packets in accordance with an embodiment of the invention.

With reference to FIGS. 6, 7 and 8, an example is now described for the transmission of a packet from a Bluetooth host in one piconet to a Bluetooth host in another piconet.

Referring to FIG. 6, there is illustrated the seven device arrangement of FIG. 1, in which a packet is to be transmitted from the Bluetooth device 112, forming a source, to the Bluetooth device 122, forming a destination.

For the purposes of this example it is assumed that each master Bluetooth device is a member of an all-masters multicast group. The multicast support is assumed from the emerging enhancements to the Bluetooth network encapsulation protocol (BNEP). In this arrangement, when a subordinate device within a piconet, termed a source piconet, wishes to send a packet, the packet is always transmitted to the master of that particular source piconet.

When a particular Bluetooth enabled device is a member of multiple piconets, the subordinate transmits the packet to the master of the particular piconet with which it is associated depending on the particular time-sharing method used for participation in multiple piconets.

Referring to FIG. 7a, in a step 702 the packet or message to be transmitted by the subordinate 112 is received by the associated master device 110.

In a step 704, the master device scans its neighbour cache to verify if the destination is in the same piconet. If the destination is in the same piconet, which will be indicated by the presence of the destination in the neighbour cache, then in a step 708 the packet is forwarded to the destination.

If the destination is not in a neighbour cache in step 704, then in a step 706 it is determined whether the destination is in the master device's destination cache. On scanning the destination cache, if an entry corresponding to the destination is found then again in step 708 the packet is forwarded to the destination.

If in step 706 it is determined that the destination is not in the master destination cache, then in a step 710 the master device buffers the packet to be transmitted. After buffering the packet, the master device 110 sends a "destination discovery" message to the all-masters multicast address, as denoted by step 712.

Referring to FIG. 8, it can be seen that the master device 110 transmits a destination discovery message 804 to each of the master devices 114, 118, and 120.

The destination discovery message carries the destination address for the packet as an option in the multicast message. Only the master nodes in the subnet, which may scan multiple piconets, process the destination discovery message.

Referring to FIG. 7b, there is illustrated the steps carried out in a master device receiving the destination discovery message. In a step 720, the master device, such as master device 120, receives the destination discovery message.

In a step 722, the master device 120 looks-up in its neighbour cache to see if the destination address is contained within its neighbour cache. If in step 724 it is determined that the destination is not in its neighbour cache, then in step 726 the packet is dropped.

When a match is found, and the master device 120 identifies the destination as being in its neighbour cache, then in a step 728 the master device 120 updates its destination cache. In the described example, the destination device 122 is contained within the piconet for which the device 120 is the master, and hence the destination is within the neighbour cache of the master device 120.

The updating of the destination cache of the master 120 in step 728 comprises updating the cache with the sender masters (SM) IP address, the MAC address of the packet that carried the destination discovery message to the destination master (DM) and the interface (or piconet ID) on which the destination discovery message arrived.

In a step 730, the destination master 120 then copies the destination address into an ICMP message as an option, and in a step 732 forwards such ICMP message using the newly created destination cache entry. The forwarding of the ICMP message from the destination master to the source master is represented by signal 806 in FIG. 8.

Following the transmission of the ICMP message in step 732, the next hop upstream host would also have performed a similar update as is done by the destination master to its destination cache, if it did not already possess an entry for the sender's master. As such, the upstream host also forwards the packet towards the sender's master, using its destination cache. The reverse path forwarding thus follows a hop-by-hop forwarding using the destination cache potentially created during multicast in the forward direction.

The ICMP message transmitted by the destination message is an example of a message which may be returned, which in general can be considered to be a "destination discovered" message, which is unicasted back to the sender's master.

Referring to FIG. 7a, in a step 714 the source master receives the destination discovered message unicasted back towards it. In step 716 the source master updates its destination cache, and then in a step 718 forwards the message, or packet, from the source device 112 toward the destination device 122. This is represented in FIG. 8 by the transmission of the message 808 from the master 110 to the master 118, to the master 120, and to the subordinate device 122.

In practice, a destination master may receive multiple messages due to the multicast from the sender's master. In such a case, the destination master discards all of those copies except the one arriving on the interface which is used for the reverse path forwarding towards the sender's master. Intermediate master nodes preferably do not multicast packets back on the interface on which the packet arrives.

The invention may be preferably implemented using Bluetooth baseband module (APIs). Specifically, the APIs that provide link connectivity information may be utilised to invoke the SHA message. In addition, the IPv6 stateless auto-configuration may be used to formulate IPv6 addresses.

The packet forwarding mechanism is preferably implemented below the IP layer where neighbour discovery (RFC 2461) and the address resolution protocol (ARP) (RFC 826) traditionally reside. The destination discovery and destination discovered messages may be implemented as ICMP (RFC 2463) messages. The destination address option is an ICMP option.

The invention has been described herein by way of reference to a particular exemplary embodiment, in particular with reference to an example scenario as set out in FIG. 6. It should be noted that the invention is not limited in any way to the specific scenarios described. The scope of the invention is defined by the appended claims.

The invention claimed is:

1. A system, comprising:
a plurality of wireless piconets, each piconet including one or more wireless apparatuses, each apparatus being assigned an Internet protocol, IP, address such that the apparatus of the plurality of piconets form a wireless subnetwork, said subnetwork being formed dynamically, and
wherein the IP address for each apparatus is determined in dependence on a prefix allocated to each of the plurality of wireless piconets.

2. The system according to claim 1, wherein each apparatus is connected to the subnetwork via a short-range wireless communication link.

3. The system according to claim 2, wherein the wireless communication link is a Bluetooth link.

4. The system according to claim 1, wherein the prefix for each of the plurality of wireless piconets is determined by a master apparatus of the piconet.

5. The system according to claim 4, wherein the prefix is determined by the master apparatus by one of obtaining the prefix from a further master apparatus with which a connection is established, obtaining the prefix from a gateway with which a connection is established, and generating a prefix pseudo randomly.

6. The system according to claim 4, wherein the prefix is provided from the master apparatus to any subordinate apparatus in the piconet.

7. The system according to claim 4, wherein the IP address is generated for each apparatus in dependence on the prefix and a unique identifier of the apparatus.

8. The system according to claim 7, wherein the unique identifier is media access control address of the apparatus.

9. The system according to 1, wherein a master apparatus of each of the plurality of piconets maintains a neighbour cache for storing the IP address of a subordinate apparatus in the piconet.

10. The system according to claim 1, wherein a master apparatus of the piconet maintains a destination cache for storing an IP address of a apparatus connected in a different piconet.

11. The system according to claim 1, wherein for each address included in a destination cache, associated routing information is stored in the destination cache.

12. The system according to claim 11, wherein the associated routing information includes an identity of a next hop.

13. The system according to claim 12, wherein the next hop is the IP address of a master apparatus of another piconet within the subnetwork.

14. The system according to claim 1, wherein, prior to transmission of a packet from a source apparatus to a destination apparatus, a source master apparatus transmits a request to locate the destination apparatus, said request is sent to all master apparatus in the subnetwork.

15. The system according to claim 14, wherein the request is forwarded between master apparatuses in the subnetwork.

16. The system according to claim 14, wherein the request is transmitted only if the IP address of the destination apparatus is not included in a neighbour cache or a destination cache of the source master apparatus.

17. The system according to claim 14, wherein on receipt of the request a master apparatus determines whether the destination apparatus is in its piconet.

18. The system according to claim 14, wherein on determination that the destination apparatus is in its piconet, a destination master apparatus receiving the request message transmits a response message to the source master apparatus.

19. The system according to claim 17, wherein on determination that the destination apparatus is in its piconet the destination master apparatus updates its destination cache with the details of the source master apparatus.

20. The system according to claim 18, wherein on receipt of the response message the source master apparatus updates its destination cache with the details of the destination master apparatus.

21. The system according to claim 20, wherein the source master apparatus transmits the packet toward the destination apparatus in accordance with routing information in the destination cache.

22. The system according to claim 14, wherein an originating master buffers the packet.

23. An apparatus, comprising:
a receiver configured to receive a prefix to generate an IP address, wherein the IP address is generated in dependence on the prefix and a unique identifier of the apparatus, and the apparatus is assigned the IP address such that the apparatus becomes part of a wireless subnetwork based on a plurality of piconets, said subnetwork being formed dynamically, and
wherein the IP address for the apparatus is determined in dependence on the prefix allocated to each of a plurality of wireless piconets.

24. The apparatus according to claim 23, wherein the unique identifier is a media access control address of the apparatus.

25. The apparatus according to claim 23, comprising a master apparatus of the piconet, wherein the master apparatus comprises
a receiver configured to obtain the prefix from a master apparatus of a further piconet to which the master device is connected, to obtain the prefix from a gateway to which the master device is connected, or to generate the prefix pseudo randomly.

26. The apparatus according to claim 25, wherein the master apparatus is further configured to transmit the prefix to any subordinate apparatus of the piconet.

27. The apparatus according to claim 26, wherein the master apparatus is configured to transmit the prefix as a subnet-head advertisement message.

28. The apparatus according to claim 25, wherein the master apparatus is configured to generate the IP address for each subordinate apparatus in the piconet, and store said IP address in a neighbour cache of the master apparatus.

29. The apparatus according to claim 23 comprising a subordinate apparatus of a piconet, wherein the subordinate apparatus is configured to obtain the prefix from the master apparatus of the piconet.

30. The apparatus according to claim 28 wherein the subordinate apparatus is configured to receive the prefix in a subnet-head advertisement message.

31. A method, comprising:
providing each of a plurality of wireless apparatuses operating in a corresponding plurality of piconets. which comprise at least one of said plurality of wireless apparatuses, with an Internet protocol, IP, address, such that each of the plurality of wireless apparatuses are assigned an IP address, and wherein the assigned IP addresses establish a wireless subnetwork, said subnetwork being formed dynamically, and
wherein the IP address for each apparatus is determined in dependence on a prefix allocated to each of the plurality of wireless piconets.

32. The method according to claim 31 further comprising connecting each apparatus to the subnetwork via a short-range wireless communication link.

33. The method according to claim 31 further comprising connecting each apparatus to the subnetwork via a Bluetooth link.

34. The method according to claim 31 further comprising determining the IP address for each apparatus in dependence on a prefix allocated to each piconet.

35. The method according to claim 34 further comprising determining the prefix for each of the plurality of wireless piconets by a master apparatus of the piconet.

36. The method according to claim 35 wherein the step of determining the prefix comprises one of obtaining the prefix from a further master apparatus with which a connection is established, obtaining the prefix from a gateway with which a connection is established, and generating a prefix pseudo randomly.

37. The method according to claim 35 further comprising providing the prefix from the master apparatus to any subordinate apparatus in the piconet.

38. The method according to claim 35 further comprising generating the IP address for each apparatus in dependence on the prefix and a unique identifier of the apparatus.

39. The method according to claim 38 in which the unique identifier is an IEEE MAC address of the apparatus.

40. The method according to 31 further comprising maintaining a neighbour cache for each master apparatus of each of the plurality of wireless piconets, the neighbour cache being for storing the IP address of a suboridnate apparatus in the piconet.

41. The method according to claim 31 further comprising maintaining a destination cache for each master apparatus of each of the plurality of wireless piconets, the destination cache being for storing the IP address of a apparatus connected in a different piconet.

42. The method according to claim 31 further comprising storing, for each address included in the destination cache, associated routing information.

43. The method according to claim 42 wherein the associated routing information includes an identity of a next hop.

44. The method according to claim 43 wherein the next hop is the IP address of a master apparatus of another piconet within the subnetwork.

45. The method according to claim 31 further comprising a step of, prior to transmission of a packet from a source apparatus to a destination apparatus, transmitting a request to locate the destination apparatus to all master apparatuses in the subnetwork from a source master apparatus.

46. The method according to claim 45 further comprising forwarding the request between master apparatuses in the subnetwork.

47. The method according to claim 45 further comprising a step of only transmitting the request if the IP address of the destination apparatus is not included in a neighbour cache or a destination cache of the source master apparatus.

48. The method according to claim 45 further comprising a step of, on receipt of the request, determining whether the destination apparatus is in the piconet of the master apparatus.

49. The method according to claim 48 further comprising a step, on determination that the destination apparatus is in its piconet, of transmitting a response message to the source master apparatus.

50. The method according to claim 48 further comprising a step, on determination that the destination apparatus is in its piconet, of updating its destination cache with the details of the source master apparatus.

51. The method according to claim 49 further comprising updating the source master destination cache on receipt of the response message with the details of the destination master apparatus.

52. The method according to claim 51 further comprising a step of transmitting the packet toward the destination apparatus in accordance with routing information in the destination cache.

53. The method according to claim 52 further comprising buffering the packet at an originating master.

54. A method comprising
providing a prefix to generate an IP address of an apparatus in a wireless piconet;, and
generating the IP address in dependence on the prefix and a unique identifier of the apparatus, and the apparatus is assigned the IP address such that the apparatus becomes part of a wireless subnetwork based on a plurality of piconets, said subnetwork being formed dynamically, and
wherein the IP address for the apparatus is determined in dependence on a prefix allocated to each of a plurality of wireless piconets.

55. The method according to claim 54, wherein the unique identifier is a media access control address of the apparatus.

56. The method according to claim 54 wherein the apparatus is a master apparatus of a piconet, wherein the method further comprising:
obtaining the prefix from a master apparatus of a further piconet to which the master apparatus is connected;
obtaining the prefix from a gateway to which the master apparatus is connected; or
generating the prefix pseudo-randomly.

57. The method according to claim 56 further comprising transmitting the prefix from the master apparatus to any subordinate apparatus of the piconet.

58. The method according to claim 57 wherein the master apparatus is configured to transmit the prefix as a subnet-head advertisement message.

59. The method according to claim 56 further comprising generating, at the master apparatus, the IP address for each subordinate apparatus in the piconet, and storing said IP address in a neighbour cache of the master apparatus.

60. The method according to claim 54 wherein the apparatus is a subordinate apparatus of a piconet, the method comprising configuring the subordinate apparatus to obtain the prefix from the master apparatus of the piconet.

61. The method according to claim 60 wherein the subordinate apparatus is configured to receive the prefix in a subnet-head advertisement message.

62. A computer program embodied on a computer readable medium, said computer program configured to control a processor to perform:
providing each of a plurality of wireless apparatuses operating in a corresponding plurality of piconets, which comprise at least one of said plurality of wireless apparatuses, with an Internet protocol, IP, address, such that each of the plurality of wireless apparatuses are assigned an IP address, and wherein the assigned IP addresses establish a wireless subnetwork, said subnetwork being formed dynamically, and
wherein the IP address for each apparatus is determined in dependence on a prefix allocated to each of the plurality of wireless piconets.

63. A computer program embodied on a computer readable medium, said computer program configured to control a processor to perform:
providing a prefix to generate an IP address of an apparatus in a wireless piconet; and
generating the IP address in dependence on the prefix and a unique identifier of the apparatus, and the apparatus is assigned the IP address such that the apparatus becomes part of a wireless subnetwork based on a plurality of piconets, said subnetwork being formed dynamically, and
wherein the IP address for the apparatus is determined in dependence on the prefix allocated to each of a plurality of wireless piconets.

* * * * *